June 13, 1939.  L. MARMOREK  2,162,096
DEVICE FOR PRODUCING WHIPPED CREAM
Filed Aug. 6, 1938
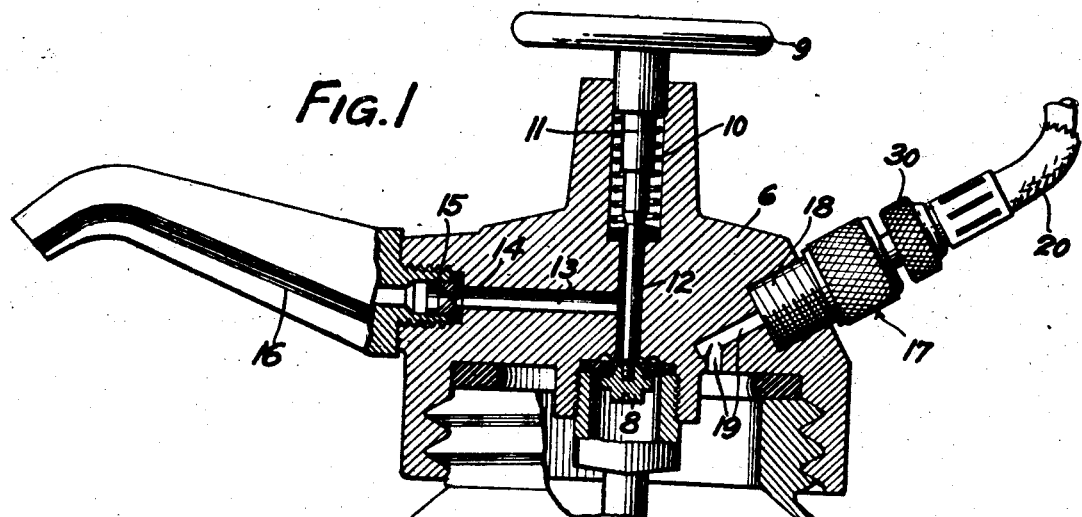
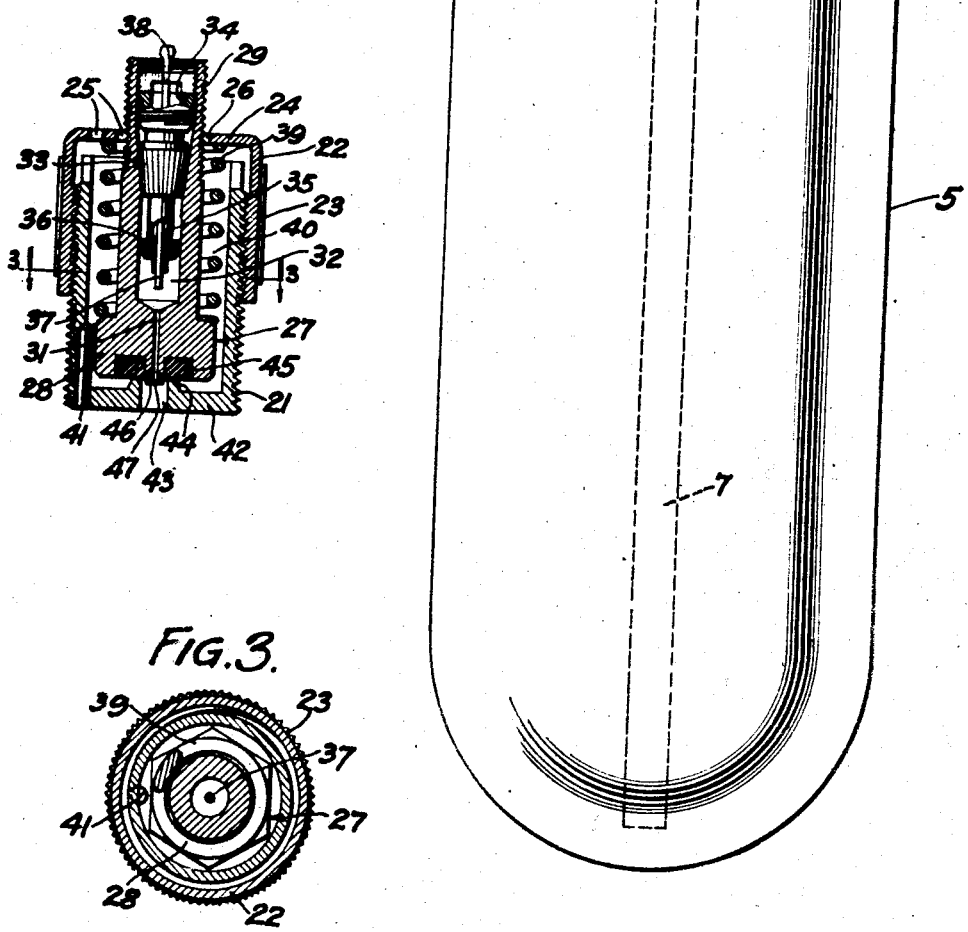
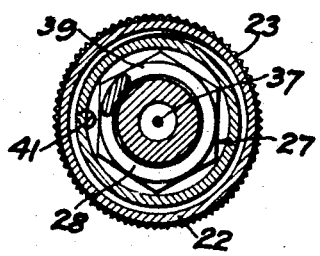
INVENTOR
LOUIS MARMOREK
BY
ATTORNEY Patented June 13, 1939

2,162,096

UNITED STATES PATENT OFFICE 2,162,096

DEVICE FOR PRODUCING WHIPPED CREAM

Louis Marmorek, Brooklyn, N. Y., assignor to Auto Cream Whip Corporation, New York, N. Y., a corporation of New York Application August 6, 1938, Serial No. 223,555

14 Claims. (Cl. 221—74)

This invention relates to devices for the production of whipped cream, and particularly to a combination charging and safety valve unit adapted for use in that type of apparatus adapted to operatively employ a mixture of a selected gas under pressure and liquid cream in the production of said product.

A recently developed and now commonly employed method for producing whipped cream involves the use of a syphon-like apparatus including a container for the liquid cream and into which a gas, such a nitrous oxide or carbon dioxide or other suitable gaseous medium, is introduced under pressure for admixture with the liquid,—there being suitable conducting means for conveying the mixture to a restricted orifice from which the resultant whipped cream product is ejected through a spout. Some of the devices of this class are provided with an independent cartridge containing the selected gas under pressure and others are provided with a suitable fitting communicating between the container and an outside source of gas supply; and all devices in this category contain some form of pressure relief mechanism enabling a release of the gases within the container should the pressure therein exceed a predetermined magnitude. It has been found, however, that due to the fact that it is only at rare occasions that a dangerous pressure is generated within the device, the pressure relief mechanism is seldom brought into action, so that the internal portion thereof generally becomes clogged up with dried-up cream products. This coagulation or "caking" at times forms a hardened crust or coating over the outlet orifice of the pressure relief valve to prevent its operation, thereby rendering devices of this construction extremely dangerous to operate. And it has also been found that, for the reasons aforesaid, the various crevices or recesses in the immediate region of the pressure relief mechanism becomes a breeding place for bacteria and thus extremely unsanitary as a device for producing an edible substance.

It is hence primarily within the contemplation of this invention to eliminate the shortcomings and dangers hereinabove referred to, and this objective I accomplish by providing a unitary device containing a combined charging and pressure relief mechanism, both operatively associated with a single inlet-outlet port. In this manner the said port is at all times subjected to the cleansing action of the relatively frequent currents of gas under pressure introduced therethrough, so that should an excessive pressure be generated within the device, it will readily permit of an escape of the gases through the said port.

It is another object of this invention to provide a device for accomplishing the above functions that is simple in construction and readily and conveniently adapted for employment in cream whipping devices in the above category.

Other objects, features and advantages will appear from the drawing and the description hereinafter given.

In the drawing,

Figure 1 is a side view including a fragmentary vertical section of a cream whipping device containing my invention.

Figure 2 is a longitudinal section taken axially through the combined charging and safety valve employed in the structure of Figure 1, and Figure 3 is a transverse section of Figure 2 taken along line 3—3.

In the drawing, the syphon-like structure includes the container 5 provided with a head portion 6 shown, in the form illustrated, in threaded engagement with the upper portion of the container. The said head portion 6 contains certain conventional mechanism for a device of this nature, including the inner tube 7, the valve 8, the valve push member 9, the helical spring 10 about the stem 11 of the valve member, the passageways 12 and 13, the restricted orifice 14 at the inlet portion of the expansion member 15, and the spout 16. In cooperative relation with said conventional portions is the combination charging and safety valve assembly 17, forming part of my invention, this being operatively attached, preferably by a threaded fitting 18, to the said head 6 of the device. Operatively communicating with the unit 17 and the interior of the container 5 is the channel 19. In the form illustrated, the unit 17 is shown operatively connected to a hose or pipe 20 which connects with a suitable source of gas supply not shown in the drawing.

The unitary member 17 contains a tubular fitting 21 the outer lateral surface of which is threaded whereby it could be detachably secured to the head portion 6 of the device, as clearly indicated in the drawing. Also in threaded engagement with said fitting 21 is the cap or ferrule 22 preferably containing a knurled outersurface 23 for manual manipulation,—said ferrule containing a top wall 24 provided with outlet apertures 25 and a central opening 26.

Centrally positioned within the tubular casing 21 is the valve member 27 which contains a head portion 28 (preferably of polygonal configuration as shown in Figure 3; and an elongated portion 29 extending outwardly through said central opening 26, the protruding part of portion 29 being threaded to receive thereon a suitable closure cap (not shown) and the fitting 30 associated with the pipe 20.

The internal portion of valve member 27 contains a relatively narrow channel 31 communicating with a central chamber 32 adapted to receive a one-way valve mechanism for permitting the introduction of gas from pipe 20 only in the direction of the container 5. In the form illustrated, a "Schrader" type of valve 33 is employed, the internal structure thereof not being disclosed inasmuch as it is well known to anyone skilled in the art. For the purpose of this specification, however, it should be noted that the charging valve contains an inlet portion 34 operatively communicating with the outlet 35 which is normally closed by the member 36 attached to pin 37 the outer end thereof containing a head portion 38 adapted for operative engagement by the conventional member 30.

Mounted over the elongated portion 29 of valve member 27 is the helical spring 39 in abutting engagement with the head 28 of the valve member and the wall 24 of the ferrule 22. It will be noted that the said elongated portion 29 is of reduced diameter, thereby providing a space 40 between the valve member 27 and the tubular member 21. The pin 41 is suitably positioned within the wall of tubular member 21 in a longitudinal direction, a portion of said pin extending inwardly and being in engagement with the adjacent lateral wall of head 28 to prevent a rotational movement of valve member 27, and yet permit a ready insertion of said member within the casing 21.

The said tubular casing 21 contains a transversely disposed lower wall 42 containing a central port 43 therein positioned axially in line with the said channel 31. The inner portion of wall 42 contains an annular lip 44 surrounding said port 43 and constituting an elevated valve seat upon which the valve member 27 is adapted to normally rest under the influence of the spring 39. In the preferred form of my invention the valve member 27 contains a washer or circular strip of rubber 45 adapted for operative engagement with the said seat 44,—it being preferred that the circle of contact between the seat and washer be relatively close to the inner circular edge of the washer, as clearly shown in Figure 2 of the drawing. It is also preferred, although not indispensable, that the channel 31 communicate with a plurality of small divergent channels 46 passing through the central boss 47 of the valve member 27 which extends into the said port 43.

In assembling this device for operation, a suitable spring 39 is selected to conform with the pressure requirements within the container 5. The ferrule 22 is rotatably manipulated so as to provide sufficient tension within said spring to enable the ferrule to be operatively actuated when a predetermined pressure is attained within the container 5.

In charging the device with a selected gas under pressure, the fitting 30 is operatively applied to the end of portion 29 of valve 27, thereby engaging the head 38 to force the pin 37 and consequently the valve 36 downwardly, in this manner permitting the gas to pass from the inlet 34 to the outlet 35, through the channel 31 and port 43, and then through the passageway 19 into the container. Upon a removal of the member 30, the pin 37 and valve 36 will be brought back to their normal closed positions by suitable conventional springs not illustrated in the drawing but of common construction and known to those familiar with the art. There obviously is at all times a certain back pressure applied against the valve 27, but if such pressure is below a predetermined value, the said valve 27 will remain on its seat 44 and prevent the escape of any of the gases. When the gas within the container exceeds the predetermined pressure, it will lift the valve 27 against the action of spring 39, to permit the escape of gases through the space 40 and apertures 25 into the atmosphere; and when the pressure is finally reduced to a predetermined value, the valve 27 will return to its seat as indicated in Figure 2.

It is thus apparent that both the incoming gases through the charging valve, and the outgoing gases, must both pass through the port 43, which is as clearly appears from the drawing positioned within a conduit extending from the container 5 to the atmosphere. Whenever gas is being introduced into the chamber through channel 31 it must of necessity pass through port 43, clearing it of any accumulated particles of cream that may have found their way to this region upon the release of the pressure. It is thus obvious that the port 43 must at all times be kept clean by the action of the incoming gases, thereby rendering the pressure relief mechanism operative at all times, and in a sanitary condition. The channel 31, it will be noted, is at all times in direct communication with the port 43,—the said boss 47 assuring the direct injection of gas therefrom through the port. The divergent channels 46, although not indispensable as aforesaid, serve the additional purpose of clearing the adjacent region of port 43 from all accumulated particles.

Due to the relative position of the seat 44 and rubber washer 45, there will be relatively little, if any, displacement of the washer material towards the boss 47,—so that whatever displacement may occur will take place in an outward direction; but it should nevertheless be noted that in view of the fact that the washer 45 is encased on three sides by the walls of the circular recess within member 27, there is hardly any opportunity for displacement whatsoever.

Aside from the above-described method of operation of the unitary charging and safety valve construction, the operation of the apparatus is generally similar to that of other conventional devices of this nature. The mixture of gas and cream is forced up through the tube 7, and when the valve 8 is depressed by applying a downward pressure upon member 9 against the action of spring 10, the mixture will pass upwardly and outwardly through passageways 12 and 13, and through the restricted orifice 14 into the expansion member 15, and then in the form of whipped cream out of the spout 16.

It is of course understood that the various embodiments above described and shown in the drawing are illustrative of my invention and not employed by way of limitation, inasmuch as numerous changes and modifications may be made within the scope of the appended claims without departing from the spirit of this invention.

What I claim is:

1. In a device for producing whipped cream, a container for housing liquid cream and a selected gas under pressure, discharge means for the mixture of cream and gas, a conduit extending into the container and having a gas port therein, charging means operatively positioned between a source of gas supply and said port, and pressure relief means operatively positioned between said port and the atmosphere, the said port being adapted to receive therethrough incoming gas from said charging means and outgoing gas from the container.

2. In a device for producing whipped cream, a container for housing liquid cream and a selected gas under pressure, a conduit extending between the interior of the container and the atmosphere and having a portion thereof provided with a gas port, a pressure relief valve in said conduit, yieldable means exerting an effort of predetermined magnitude upon the valve for normally holding it in closed engagement with said port to prevent communication between the container and the atmosphere up to a predetermined pressure, a charging valve between said port and a suitable source of gas supply, the outlet portion of said charging valve being at all times in direct communication with said port independent of the position of the pressure relief valve, a spout associated with the container, and means for operatively conducting the gas and cream within the container to said spout.

3. In a device for producing whipped cream, a container for housing liquid cream and a selected gas under pressure, discharge means for the mixture of cream and gas, a conduit extending into the container and having a gas port therein, pressure relief means operatively positioned between the said port and the atmosphere, a passageway within said pressure relief means communicating between a source of gas supply and said port, one-way valve means within said passageway to permit the flow of gases only in the direction of said port, said pressure relief means being operatively set to permit the flow therethrough from the port to the atmosphere of gas from the container when the pressure therein exceeds a predetermined limit, the said port being adapted to receive therethrough incoming gas from said charging means and outgoing gas from the container.

4. In a device for producing whipped cream, the combination according to claim 3, the pressure relief means containing a movable member yieldably held in engagement with the wall of said port and operatively movable out of engagement therewith under the influence of the gas in the container when above a predetermined pressure, the said passageway extending through said member, and a gas-supply fitting engageable with said member for directing the gas from the source of supply to said passageway.

5. In a device for producing whipped cream, the combination according to claim 3, the pressure relief means containing a movable member yieldably held in engagement with the wall of said port and operatively movable out of engagement therewith under the influence of the gas in the container when above a predetermined pressure, the said passageway comprising a chamber housing said one-way valve means, and a relatively narrow channel communicating between said chamber and the said port.

6. In a device for producing whipped cream, a container for housing liquid cream and a selected gas under pressure, discharge means for the mixture of cream and gas, a combination charging and pressure relief unit attached to the container, and a channel operatively communicating between the container and the unit, said unit containing a tubular casing with a transverse wall therein containing an apertured portion constituting a gas port, the casing having a portion thereof in communication with the atmosphere, a valve member longitudinally movable within the casing and operatively engageable with said apertured portion for opening and closing said gas port, yieldable means normally holding said valve member in closed engagement with said port against the action of the gas in the container, a passageway extending axially within said valve member and communicating between a source of gas supply and said port, and one-way valve means within said passageway to permit the flow of gases only in the direction of said port, the said port being adapted to permit the passage therethrough of incoming gas from said one-way valve and outgoing gas from the container.

7. In a device for producing whipped cream, the combination according to claim 6, further provided with a ferrule in detachable engagement with said casing and containing air apertures therein and a central opening in a plane transverse to the longitudinal axis of the casing, the said valve member having a portion thereof extending through said opening and free for operative longitudinal movement therethrough.

8. In a device for producing whipped cream, the combination according to claim 6, further provided with a ferrule in detachable engagement with said casing and operatively accommodating said valve member, said valve member having an enlarged head portion at one end thereof, said yieldable means comprising a helical spring mounted over the valve member and operatively positioned between the said head thereof and the ferrule, the said valve member having portions thereof substantially throughout the length thereof in spaced relation with the casing to permit the passage of gas therebetween.

9. In a device for producing whipped cream, the combination according to claim 6, further provided with a ferrule in detachable engagement with said casing and operatively accommodating said valve member, said valve member having an enlarged head portion at one end thereof of polygonal configuration, means affixed to the interior of the casing and engageable with said head portion to hold the member against rotational movement, the said valve member having portions thereof substantially throughout the length thereof in spaced relation with the casing to permit the passage of gas therebetween.

10. In a device for producing whipped cream, the combination according to claim 6, further provided with a ferrule in detachable engagement with said casing and containing air apertures therein and a central opening in a plane transverse to the longitudinal axis of the casing, the said valve member having a portion thereof extending through said opening and free for operative longitudinal movement therethrough, a fitting in detachable engagement with the outwardly extending portion of said member for directing the gas from the source of supply to said passageway, the said passageway comprising an enlarged chamber housing said one-way valve means, and a relatively narrow channel communicating between said chamber and the said port.

11. In a device for producing whipped cream, the combination according to claim 6, the said transverse wall of the casing being provided with an inner elevated wall about the apertured portion thereof to form a valve seat at the said port, the valve member being adapted for operative engagement with said valve seat.

12. In a device for producing whipped cream, the combination according to claim 6, the said transverse wall of the casing being provided with an inner elevated wall about the apertured portion thereof to form a valve seat at the said port, the valve member being provided with a yieldable element at the base thereof for operative engagement with said valve seat.

13. In a device for producing whipped cream, the combination according to claim 6, the said transverse wall of the casing being provided with an inner elevated wall about the apertured portion thereof to form a valve seat at the said port, the base of the valve member containing a protruding boss extending into said port, said passageway extending through said boss.

14. In a device for producing whipped cream, the combination according to claim 6, the said transverse wall of the casing being provided with an inner elevated wall about the apertured portion thereof to form a valve seat at the said port, the base of the valve member containing a protruding boss extending into said port, said passageway extending through said boss, said boss containing a plurality of divergent channels extending from said passageway to said port.

LOUIS MARMOREK.